US012440816B2

(12) United States Patent
Zhang et al.

(10) Patent No.: US 12,440,816 B2
(45) Date of Patent: Oct. 14, 2025

(54) LIQUID DISPENSING PUMP AND LIQUID DISPENSING DEVICE

(71) Applicant: SHENZHEN YHLO BIOTECH CO., LTD, Shenzhen (CN)

(72) Inventors: Fuxing Zhang, Shenzhen (CN); Yujin Xiao, Shenzhen (CN); Kunhui Hu, Shenzhen (CN); Huanjie Qiu, Shenzhen (CN)

(73) Assignee: SHENZHEN YHLO BIOTECH CO., LTD, Shenzhen (CN)

( * ) Notice: Subject to any disclaimer, the term of this patent is extended or adjusted under 35 U.S.C. 154(b) by 978 days.

(21) Appl. No.: 17/601,587

(22) PCT Filed: Dec. 24, 2019

(86) PCT No.: PCT/CN2019/128051
§ 371 (c)(1),
(2) Date: Oct. 5, 2021

(87) PCT Pub. No.: WO2020/248573
PCT Pub. Date: Dec. 17, 2020

(65) Prior Publication Data

US 2022/0347640 A1 Nov. 3, 2022

(30) Foreign Application Priority Data

Jun. 12, 2019 (CN) ........................ 201910505523.4

(51) Int. Cl.
*B01F 35/71* (2022.01)
*B01F 23/40* (2022.01)
(Continued)

(52) U.S. Cl.
CPC ...... *B01F 35/717613* (2022.01); *B01F 23/49* (2022.01); *B01F 35/2112* (2022.01);
(Continued)

(58) Field of Classification Search
CPC .......... B01F 35/717613; B01F 35/2112; B01F 35/831; B01F 2101/23
See application file for complete search history.

(56) References Cited

U.S. PATENT DOCUMENTS 4,267,203 A * 5/1981 Motz ........................ G11B 5/84
427/128
4,366,918 A 1/1983 Naka
(Continued)

FOREIGN PATENT DOCUMENTS

CN 2626602 Y 7/2004
CN 102297108 A 12/2011
(Continued)

OTHER PUBLICATIONS

International Search Report, and English Translation thereof, for International Application No. PCT/CN2019/128051, mailed Mar. 23, 2020 (6 pages).
(Continued)

*Primary Examiner* — Marc C Howell
(74) *Attorney, Agent, or Firm* — Kagan Binder, PLLC

(57) ABSTRACT

A liquid dispensing pump comprises: a first liquid storage cylinder, a second liquid storage cylinder, a first plunger movably connected to the first liquid storage cylinder, a second plunger movably connected to the second liquid storage cylinder , and a drive assembly connected to the first plunger and the second plunger. The first liquid storage cylinder is provided with a first liquid entry and exit port. The second liquid storage cylinder is provided with a second liquid entry and exit port. One end of the first plunger is inserted into an internal cavity of the first liquid storage cylinder. One end of the second plunger is inserted into an internal cavity of the second liquid storage cylinder. Further provided is a liquid dispensing device.

8 Claims, 3 Drawing Sheets

(51) Int. Cl.
*B01F 35/21* (2022.01)
*B01F 35/83* (2022.01)
*B01F 101/23* (2022.01)

(52) U.S. Cl.
CPC ........ *B01F 35/2132* (2022.01); *B01F 35/831* (2022.01); *B01F 2101/23* (2022.01)

(56) References Cited

U.S. PATENT DOCUMENTS

| | | | | | |
|---|---|---|---|---|---|
| 4,815,042 | A * | 3/1989 | Pratt | G01G 19/382 | 366/292 |
| 4,927,567 | A * | 5/1990 | Rudick | B67D 1/103 | 261/DIG. 7 |
| 5,755,561 | A | 5/1998 | Couillard et al. | | |
| 5,852,231 | A | 12/1998 | Kaji | | |
| 2010/0046320 | A1 | 2/2010 | Ishizuka et al. | | |
| 2015/0336689 | A1* | 11/2015 | Brown | A24F 47/00 | 141/370 |
| 2016/0001243 | A1* | 1/2016 | Waizenauer | B01F 35/7176 | 366/151.1 |

FOREIGN PATENT DOCUMENTS

| | | | | |
|---|---|---|---|---|
| CN | 103410696 | A | 11/2013 | |
| CN | 103994044 | A | 8/2014 | |
| CN | 103994045 | A | 8/2014 | |
| CN | 104324628 | A | 2/2015 | |
| CN | 204134593 | U | 2/2015 | |
| CN | 204233988 | U | 4/2015 | |
| CN | 207887129 | U | 9/2018 | |
| CN | 208526542 | U | 2/2019 | |
| CN | 110090570 | A | 8/2019 | |
| CN | 210186898 | U | 3/2020 | |
| DE | 3624976 | A1 | 2/1988 | |
| DE | 19511758 | A1 | 10/1996 | |
| DE | 19711292 | A1 | 11/1997 | |
| DE | 20216295 | U1 | 1/2003 | |
| EP | 0303220 | A2 | 2/1989 | |
| EP | 0709572 | A1 | 5/1996 | |
| FR | 2536471 | A1 | 5/1984 | |
| GB | 1505700 | A | 3/1978 | |
| GB | 2132283 | A | 7/1984 | |
| WO | WO-2007101786 | A1 * | 9/2007 | B01F 15/0201 |

OTHER PUBLICATIONS

Extended European Search Report for Counterpart European Application No. 19932461.7, mailed Dec. 13, 2022, (8 pages).

Chinese Office Action for Chinese Counterpart application No. 201910505523.4, mailed Oct. 26, 2023, (9 pages).

Third Chinese Office Action, and Google Translation therefore, for Chinese Counterpart Application No. 201910505523.4, mailed Jul. 27, 2024, (8 pages).

Wang et al., "Hydraulic Drive and Excavation Machinery," China University of Mining and Technology Press, pp. 40-44, Jun. 30, 2015, (6 pages). (English Abstract Only. See Third CN Office Action).

* cited by examiner

LIQUID DISPENSING PUMP AND LIQUID DISPENSING DEVICE

CROSS REFERENCE TO RELATED APPLICATIONS

The present disclosure is a national stage for International Application PCT/CN2019/128051, filed on Dec. 24, 2019, which claims priority benefit of Chinese Patent Application No. 201910505523.4 filed on Jun. 12, 2019, and entitled "LIQUID DISPENSING PUMP AND LIQUID DISPENSING DEVICE".

TECHNICAL FIELD

The present disclosure relates to the field of medical inspection instruments, in particular to a liquid dispensing pump and a liquid dispensing device.

BACKGROUND

In the field of medical inspection instruments such as chemiluminescence immunoassay analyzers, wash solutions are needed to provide better washing effects for washing needles and provide a more stable buffer system for immune responses. Generally, the wash solution is formulated with a concentrated solution and pure water in a certain ratio. At present, there are mainly two approaches. One is to formulate the wash solution by a manufacturer before leaving a factory, and directly delivering the formulated wash solution to hospitals. The drawback to it is a large volume and heavy mass of the formulated wash solution, which not only increases the transportation cost but also occupies the storage space of the hospital departments and is inconvenient to use. The other approach is to provide concentrated wash solutions to the hospital departments, and manually formulating the wash solution by instrument operators of the departments in accordance with the guidance scheme of the manufacturer. This approach has the disadvantages such as inaccurate formulation of the wash solution, proneness to errors in manual operation, and the possibility of causing damage to the skin by improper protection from a concentrated wash solution.

SUMMARY

Based on this, the present disclosure provides a liquid dispensing pump. A ratio of cross-sectional areas of a first plunger to a second plunger is set according to a preset mixing ratio. In each cycle of a reciprocating movement of the first plunger and the second plunger, a first liquid storage cylinder and a second liquid storage cylinder discharge corresponding raw materials according to the preset mixing ratio. The raw materials flow together and are mixed in a subsequent liquid path to obtain a mixed liquid in the preset mixing ratio, thereby realizing the precise mixing of different raw materials. Also, this liquid dispensing pump discharges the raw materials in the same ratio each time, so that uniform mixing can be achieved without using a specialized mixer.

A liquid dispensing pump includes:

a first liquid storage cylinder provided with a first liquid inlet/outlet port;

a second liquid storage cylinder provided with a second liquid inlet/outlet port;

a first plunger movably connected to the first liquid storage cylinder, one end of the first plunger being inserted into an inner cavity of the first liquid storage cylinder;

a second plunger movably connected to the second liquid storage cylinder, one end of the second plunger being inserted into an inner cavity of the second liquid storage cylinder; and a driving assembly connected to the first plunger and the second plunger.

In the above-mentioned liquid dispensing pump, the driving assembly is configured to drive the first plunger and the second plunger to realize linear reciprocating movement, so that the first plunger along with the first liquid storage cylinder and the second plunger along with the second liquid storage cylinder each constitute a pump body that can suck and discharge liquid. During operation, the driving assembly drives the first plunger and the second plunger to operate simultaneously, that is, the first plunger and the second plunger move the same stroke each time. The ratio of the cross-sectional area of the first plunger to the second plunger is set according to a preset mixing ratio. In each cycle of the linear reciprocating movement of the first plunger and the second plunger, the first liquid storage cylinder and the second liquid storage cylinder discharge the corresponding raw materials according to the preset mixing ratio. The raw materials flow together and are mixed in the subsequent liquid path to obtain a mixed liquid in the preset mixing ratio, thereby realizing the precise mixing of the different raw materials. Also, this liquid dispensing pump discharges the raw materials in the same ratio each time, so that uniform mixing can be achieved without using a specialized mixer.

In one of the embodiments, the first plunger has a cross-sectional area larger than that of the second plunger. Under the premise of the same stroke, the volume of the liquid pushed out by the first plunger is greater than that of the liquid pushed out by the second plunger.

In one of the embodiments, a first sealing ring is provided at a junction between the first liquid storage cylinder and the first plunger, and a second sealing ring is provided at a junction between the second liquid storage cylinder and the second plunger. The first sealing ring and the second sealing ring are configured to improve the sealing performance of the first liquid storage cylinder and the second liquid storage cylinder, respectively.

In one of the embodiments, the driving assembly includes a motor, a screw rod connected to the motor, a nut sleeved on the screw rod, and a connection block connected to the nut; and the connection block is connected to the first plunger and the second plunger, respectively. The linear reciprocating movement of the first plunger and the second plunger is realized by transmission of the screw rod.

In one of the embodiments, the driving assembly includes a motor, a first crank connected to the motor, and a second crank connected to the motor; the first crank is connected to the first plunger; and the second crank is connected to the second plunger. The linear reciprocating movement of the first plunger and the second plunger is realized by transmission of the cranks.

Also, the present disclosure further provides a liquid dispensing device.

The liquid dispensing device includes the liquid dispensing pump in any one of the above embodiments, and further includes, a first raw material tank;

a second raw material tank;

a mixing tank;

a first liquid path switcher connected among the first raw material tank, the liquid dispensing pump, and the mixing tank; and a second liquid path switcher connected among the second raw material tank, the liquid dispensing pump, and the mixing tank.

In the liquid dispensing device as described above, the first liquid path switcher selectively enables conduction of the liquid path between the first raw material tank and the liquid dispensing pump, and the second liquid path switcher selectively enables conduction of the liquid path between the second raw material tank and the liquid dispensing pump. The liquid dispensing pump sucks raw materials from the first raw material tank and the second raw material tank, respectively. Then, the first liquid path switcher selectively enables conduction of the liquid path between the mixing tank and the liquid dispensing pump, and the second liquid path switcher selectively enables conduction of the liquid path between the mixing tank and the liquid dispensing pump. The liquid dispensing pump discharges different raw materials into the mixing tank according to a preset mixing ratio. In one suction and discharge cycle of the liquid dispensing pump, the liquid dispensing device completes a period of liquid mixing in the mixing ratio that is accurate and uniform.

In one of the embodiments, the first raw material tank is provided with a first liquid level sensor; the second raw material tank is provided with a second liquid level sensor; the mixing tank is provided with a third liquid level sensor. The first liquid level sensor, the second liquid level sensor, and the third liquid level sensor are electrically connected to the driving assembly, respectively. The first liquid level sensor is configured to detect whether the liquid level of the first raw material tank reaches a preset material-taking liquid level, and the second liquid level sensor is configured to detect whether the liquid level of the second raw material tank reaches a preset material-taking liquid level. The third liquid level sensor is configured to detect the liquid level height of the existing mixed liquid in the mixing tank. According to the first liquid level sensor, the second liquid level sensor, and the third liquid level sensor, trigger signals for controlling the first liquid path switcher, the second liquid path switcher, and the liquid dispensing pump to operate can be generated, thereby achieving the automated operation of liquid dispensing.

In one of the embodiments, the first liquid path switcher and the second liquid path switcher are solenoid valves or plunger valves.

In one of the embodiments, a first water quality sensor is provided between the first raw material tank and the first liquid path switcher.

In one of the embodiments, the mixing tank is provided with a drain port, and the drain port is connected to a second water quality sensor.

Figure 1:
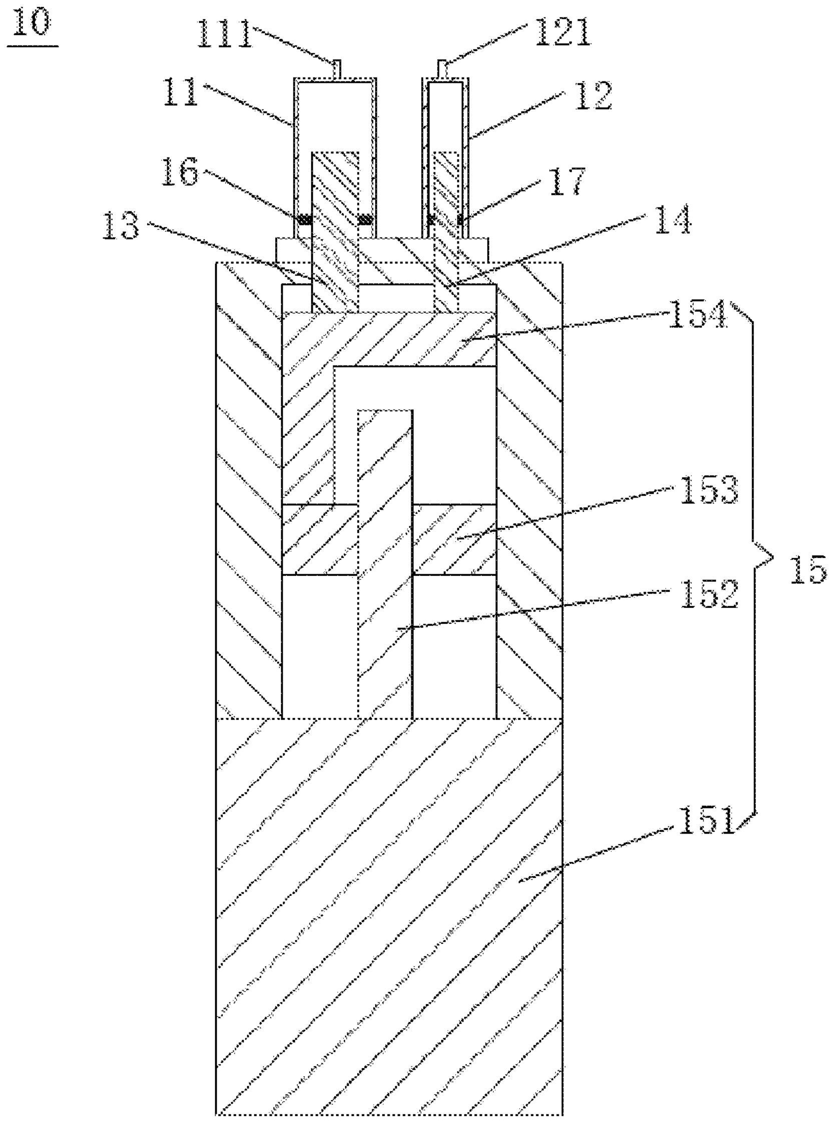
FIG. 1 is a schematic diagram of a liquid dispensing pump according to an embodiment of the present disclosure.

The meanings of reference numerals in the drawings are:

100—liquid dispensing device;

10—liquid dispensing pump, 11—first liquid storage cylinder, 111—first liquid inlet/outlet port, 12—second liquid storage cylinder, 121—second liquid inlet/outlet port, 13—first plunger, 14—second plunger, 15—driving assembly, 151—motor, 152—screw rod, 153—nut, 154—connection block, 155—first crank, 156—second crank, 16—-first sealing ring, 17—second sealing ring;

20—first raw material tank;

30—second raw material tank;

40—mixing tank;

50—first liquid path switcher;

60—second liquid path switcher;

70—first water quality sensor;

80—second water quality sensor;

90—liquid supplement component, 91—liquid pump, 92—control valve, 93—filter, 94—manual valve.

DETAILED DESCRIPTION OF THE EMBODIMENTS

In order to facilitate the understanding of the present disclosure, the present disclosure will be described more fully below with reference to the relevant drawings. The preferred embodiments of the present disclosure are shown in the drawings. However, the present disclosure can be implemented in many different forms and is not limited to the embodiments described herein. On the contrary, the purpose of providing these embodiments is to make the understanding of the present disclosure more thorough and comprehensive.

It should be noted that when an element is referred to as being "fixed to" another element, the element can be directly on the another element or there may be a mediate element. When an element is referred to as being "connected to" another element, the element can be directly connected to the another element or there may be a mediate element.

All technical and scientific terms used herein have the same meaning as commonly understood by those skilled in the technical field of the present disclosure unless otherwise defined. The terms used in the specification of the present disclosure herein are only for the purpose of describing specific embodiments, and are not intended to limit the present disclosure.

Figure 2:
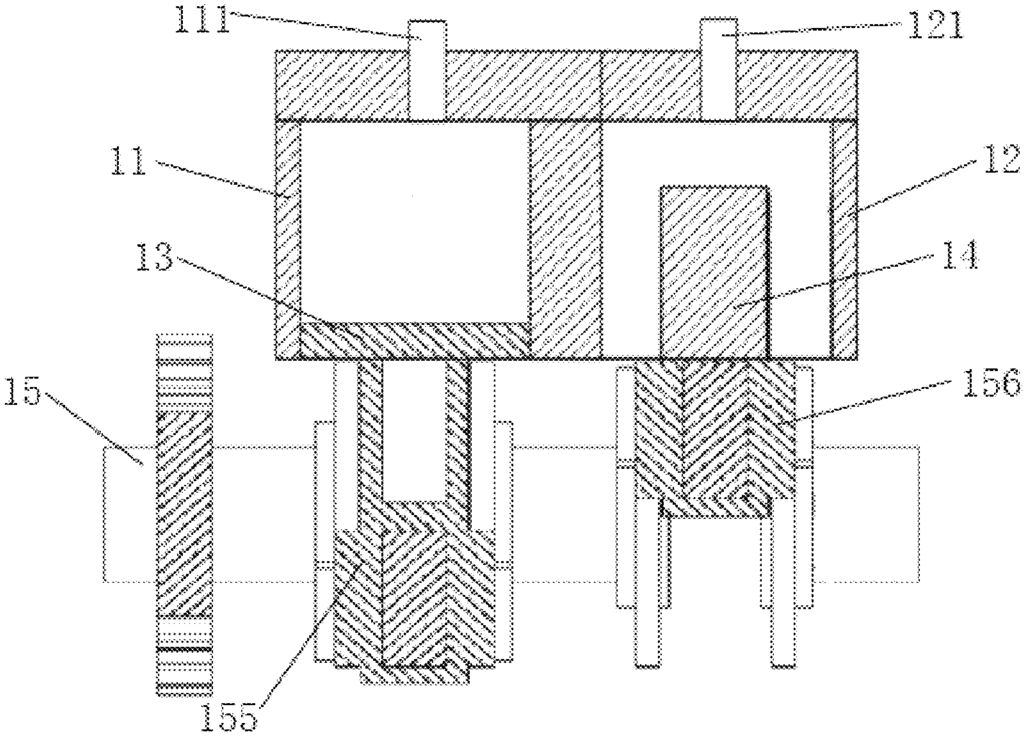
FIG. 2 is a schematic diagram of a liquid dispensing pump according to another embodiment of the present disclosure.
Figure 3:
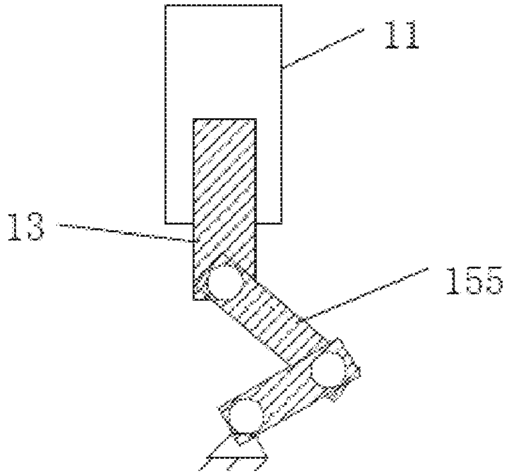
FIG. 3 is a schematic diagram of a combination of the first crank, the first plunger, and the first liquid storage cylinder in the liquid dispensing pump as shown in FIG. 2.

As shown in FIGS. 1 to 3, a liquid dispensing pump 10 according to an embodiment of the present disclosure is provided.

As shown in FIG. 1, the liquid dispensing pump 10 includes a first liquid storage cylinder 11, a second liquid storage cylinder 12, a first plunger 13 movably connected to the first liquid storage cylinder 11, a second plunger 14 movably connected to the second liquid storage cylinder 12, and a driving assembly 15 connected to the first plunger 13 and the second plunger 14. The first liquid storage cylinder 11 is provided with a first liquid inlet/outlet port 111. The second liquid storage cylinder 12 is provided with a second liquid inlet/outlet port 121. One end of the first plunger 13 is inserted into an inner cavity of the first liquid storage cylinder 11. One end of the second plunger 14 is inserted into an inner cavity of the second liquid storage cylinder 12. The driving assembly 15 is configured to drive the first plunger 13 and the second plunger 14 to reciprocate linearly.

In a case where the liquid dispensing pump 10 is applied to the above-mentioned mixing of pure water and concentrated solution, because a proportion of pure water is greater than that of concentrated solution during the mixing and dilution, the first liquid storage cylinder 11 may have a volume greater than that of the second liquid storage cylinder 12, as shown in FIG. 1. The first plunger 13 has a cross-sectional area larger than that of the second plunger 14. The first liquid storage cylinder 11 is configured to store raw materials with a relatively larger mixing proportion, and the second liquid storage cylinder 12 is configured to store raw materials with a relatively less mixing proportion. Accordingly, the cross-sectional area of the first plunger 13 is greater than that of the second plunger 14, and the volume of the liquid pushed out by the first plunger 13 is greater than that of the liquid pushed out by the second plunger 14 under the premise of the same stroke. In the same way, the liquid dispensing pump 10 can also be configured to mix other different liquid raw materials.

In addition, in consideration of the movable connection between the first plunger 13 and the first liquid storage cylinder 11 and between the second plunger 14 and the second liquid storage cylinder 12, in order to improve the sealing performance, in the present embodiment, a first sealing ring 16 is provided at the junction between the first liquid storage cylinder 11 and the first plunger 13, and a second sealing ring 17 is provided at the junction between the second liquid storage cylinder 12 and the second plunger 14. The first sealing ring 16 and the second sealing ring 17 are configured to improve the sealing performance of the first liquid storage cylinder 11 and the second liquid storage cylinder 12, respectively.

The driving assembly 15 can be implemented in various ways in order to achieve the linear reciprocating movement of the first plunger 13 and the second plunger 14.

For example, as shown in FIG. 1, in the present embodiment, the driving assembly 15 includes a motor 151, a screw rod 152 connected to the motor 151, a nut 153 sleeved on the screw rod 152, and a connection block 154 connected to the nut 153. The connection block 154 is connected to the first plunger 13 and the second plunger 14, respectively. The linear reciprocating movement of the first plunger 13 and the second plunger 14 is realized by transmission of the screw rod 152.

Taking the dilution of the concentrated solution as an example, as shown in FIG. 1, the first liquid storage cylinder 11 and the second liquid storage cylinder 12 are two mutually independent cavities with the volume of the first liquid storage cylinder 11 greater than that of the second liquid storage cylinder 12, and are configured to suck and discharge pure water and concentrated wash solution, respectively. Under the condition that the movement strokes of the first plunger 13 and the second plunger 14 are the same, the ratio of the cross-sectional areas of the first plunger 13 and the second plunger 14 is equivalent to the dilution ratio. The first plunger 13 and the second plunger 14 are mounted on the connection block 154, and the connection block 154 is fixedly connected to the nut 153. The nut 153 is engaged with the screw rod 152, and the screw rod 152 is fixedly connected to a rotating shaft of the motor 151. When the motor 151 rotates, the nut 153 rotates along with the screw rod 152 and drives the movement of the connection block 154, so that the first plunger 13 and the second plunger 14 move up and down in a piston manner. When the motor 151 rotates to drive the first plunger 13 and the second plunger 14 to move downward, pure water enters the first liquid storage cylinder 11 from the first liquid inlet/outlet port 111, and the concentrated wash solution enters the second liquid storage cylinder 12 from the second liquid inlet/outlet port 121. when the motor 151 rotates to drive the first plunger 13 and the second plunger 14 to move upward, the pure water in the first liquid storage cylinder 11 is discharged through the first liquid inlet/outlet port 111, and the concentrated wash solution in the second liquid storage cylinder 12 is discharged through the second liquid inlet/outlet port 121.

For another example, as shown in FIGS. 2 and 3, in other embodiments, the driving assembly 15 includes a motor 151, a first crank 155 connected to the motor 151, and a second crank 156 connected to the motor 151. The first crank 155 is connected to the first plunger 13. The second crank 156 is connected to the second plunger 14. The linear reciprocating movement of the first plunger 13 and the second plunger 14 is realized by transmission of the cranks.

Further, the operating strokes of the first plunger 13 and the second plunger 14 can be adjusted by adjusting the lengths of the first crank 155 and the second crank 156, so that the mixing ratio of the raw materials can be adjusted. In addition, they may also be in different phases, so that when one plunger moves downward, the other plunger moves upward, that is to say, when one plunger sucks liquid, the other plunger discharges liquid. This way can possess a higher proportioning efficiency.

It should be noted that, based on the design concept of the present disclosure, a plurality of plungers and corresponding liquid storage cylinders can be provided according to the type and mixing ratio of the raw materials. It is not limited to the case of the double plunger set forth in the present embodiment.

In the above-mentioned liquid dispensing pump 10, the driving assembly 15 is configured to drive the first plunger 13 and the second plunger 14 to realize linear reciprocating movement, so that the first plunger 13 along with the first liquid storage cylinder 11 and the second plunger 14 along with the second liquid storage cylinder 12 each constitute a pump body that can suck and discharge liquid. During operation, the driving assembly 15 drives the first plunger 13 and the second plunger 14 to operate simultaneously, that is, the first plunger 13 and the second plunger 14 move the same stroke each time. The ratio of the cross-sectional area of the first plunger 13 to the second plunger 14 is set according to a preset mixing ratio. In each cycle of the linear reciprocating movement of the first plunger 13 and the second plunger 14, the first liquid storage cylinder 11 and the second liquid storage cylinder 12 discharge the corresponding raw materials according to the preset mixing ratio. The raw materials flow together and are mixed in the subsequent liquid path to obtain a mixed liquid in the preset mixing ratio, thereby realizing the precise mixing of the different raw materials. Also, this liquid dispensing pump 10 discharges the raw materials in the same ratio each time, so that uniform mixing can be achieved without using a specialized mixer.

Figure 4:
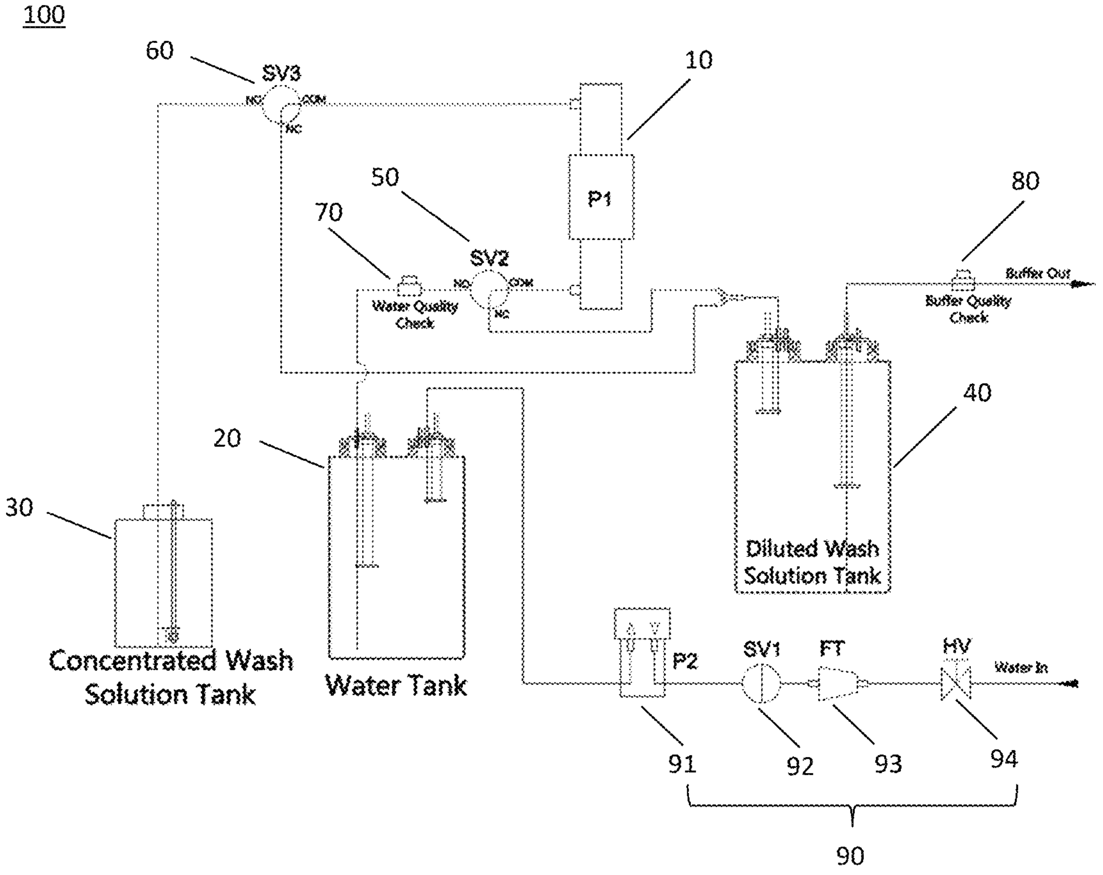
FIG. 4 is a schematic diagram of a liquid dispensing device according to an embodiment of the present disclosure.

On the basis of FIG. 1 to FIG. 3 and with reference to FIG. 4, a liquid dispensing pump 10 according to an embodiment of the present disclosure is provided.

As shown in FIG. 4, the liquid dispensing device 100 includes the liquid dispensing pump 10 as described above, and further includes a first raw material tank 20, a second raw material tank 30, a mixing tank 40, a first liquid path switcher 50, and a second liquid path switcher 60. The first raw material tank 20 and the second raw material tank 30 are configured to store raw materials, and the mixing tank 40 is configured to store a mixed liquid of different raw materials. The first liquid path switcher 50 is connected among the first raw material tank 20, the liquid dispensing pump 10, and the mixing tank 40. The second liquid path switcher 60 is connected among the second raw material tank 30, the liquid dispensing pump 10, and the mixing tank 40. The first liquid path switcher 50 and the second liquid path switcher 60 are configured to realize the suction and discharge of the corresponding raw materials in cooperation with the suction and discharge operation of the liquid dispensing pump 10.

In the present embodiment, the first liquid path switcher 50 and the second liquid path switcher 60 are solenoid valves. In other embodiments, the first liquid path switcher 50 and the second liquid path switcher 60 are both plunger valves. Under the premise that switching between different liquid paths is enabled, the first liquid path switcher 50 and the second liquid path switcher 60 may also be other types of liquid path switching devices.

In addition, the number of liquid paths of the first liquid path switcher 50 and the second liquid path switcher 60 is adjusted according to the number of raw material tanks and the number of the mixing tanks 40. For example, in the present embodiment, the first liquid path switcher 50 and the second liquid path switcher 60 are both three-way solenoid valves. It can be understood that the first liquid path switcher 50 and the second liquid path switcher 60 may also be formed by a combination of two two-way solenoid valves.

In order to realize an automated liquid dispensing operation, in this embodiment, the first raw material tank 20 is provided with a first liquid level sensor. The second raw material tank 30 is provided with a second liquid level sensor. The mixing tank 40 is provided with a third liquid level sensor. The first liquid level sensor, the second liquid level sensor, and the third liquid level sensor are electrically connected to the driving assembly 15, respectively. The first liquid level sensor is configured to detect whether the liquid level of the first raw material tank 20 reaches a preset material-taking liquid level, and the second liquid level sensor is configured to detect whether the liquid level of the second raw material tank 30 reaches a preset material-taking liquid level. The third liquid level sensor is configured to detect the liquid level height of the existing mixed liquid in the mixing tank 40. According to the first liquid level sensor, the second liquid level sensor, and the third liquid level sensor, trigger signals for controlling the first liquid path switcher 50, the second liquid path switcher 60, and the liquid dispensing pump 10 to operate can be generated, thereby achieving the automated operation of liquid dispensing.

Taking the above-mentioned dilution of the concentrated wash solution as an example, as shown in FIG. 4, the automatic dilution and dispensing will start once the low-liquid level signal of the mixing tank 40 storing the diluted wash solution is detected, under the condition that the pure water in the first raw material tank 20 and the concentrated wash solution in the second raw material tank 30 are sufficient. For a single cycle, the motor 151 drives the first plunger 13 and the second plunger 14 to move downward, respectively sucking the pure water and concentrated solution in one cycle. After the liquid suction is completed, the first liquid path switcher 50 and the second liquid path switcher 60 are turned on, and the liquid path connected to the liquid dispensing pump 10 is switched to the mixing tank 40 storing the diluted wash solution, so that the object connected by the liquid dispensing pump 10 is switched from the first raw material tank 20 and the second raw material tank 30 to the mixing tank 40. The motor 151 then drives the first plunger 13 and the second plunger 14 to move upward, so that the sucked pure water and the concentrated wash solution are discharged to the mixing tank 40. Reciprocating cycles continue until a preset high liquid level is reached in the mixing tank 40, and then the liquid dispensing operation is automatically stopped.

As shown in FIG. 4, in the present embodiment, a first water quality sensor 80 may be provided between the first raw material tank 20 and the first liquid path switcher 50.

Similarly, in the present embodiment, the mixing tank 40 is provided with a drain port, and the drain port is connected to a second water quality sensor.

In addition, the liquid dispensing device 100 can also be provided with a liquid supplement component 90. For example, in the present embodiment, as shown in FIG. 4, a liquid supplement component 90 is provided for the first raw material tank 20. For example, for the dilution of the concentrated wash solution, an automatic supplement of pure water can be set. The liquid supplement component 90 is started once the liquid level detected by the first liquid level sensor is lower than a preset low liquid level. For example, the liquid supplement component 90 includes a liquid pump 91, a control valve 92, a filter 93, and a manual valve 94 connected in sequence. The liquid pump 91 is started to pump pure water into the first raw material tank 20 once the liquid level detected by the first liquid level sensor is lower than the preset low liquid level. The liquid pump 91 is turned off once the liquid level detected by the first liquid level sensor is lower than the preset high liquid level.

In the liquid dispensing device 100 as described above, the first liquid path switcher 50 selectively enables conduction of the liquid path between the first raw material tank 20 and the liquid dispensing pump 10, and the second liquid path switcher 60 selectively enables conduction of the liquid path between the second raw material tank 30 and the liquid dispensing pump 10. The liquid dispensing pump 10 sucks raw materials from the first raw material tank 20 and the second raw material tank 30, respectively. Then, the first liquid path switcher 50 selectively enables conduction of the liquid path between the mixing tank 40 and the liquid dispensing pump 10, and the second liquid path switcher 60 selectively enables conduction of the liquid path between the mixing tank 40 and the liquid dispensing pump 10. The liquid dispensing pump 10 discharges different raw materials into the mixing tank 40 according to a preset mixing ratio. In one suction and discharge cycle of the liquid dispensing pump 10, the liquid dispensing device 100 completes a period of liquid mixing in the mixing ratio that is accurate and uniform.

The technical features of the above embodiments can be combined arbitrarily. In order to make the description concise, not all of the combinations of the technical features in the above embodiments are described. However, the combination of these technical features should be considered within the scope of this specification as long as there is no contradiction.

The above examples only express the preferred embodiments of the present disclosure with the relatively specific and detailed description, but should not be understood as a limitation on the scope of the present disclosure. It should be pointed out that for those of ordinary skill in the art, several modifications and improvements can be made without departing from the concept of the present disclosure and all fall within the protection scope of the present disclosure. Therefore, the protection scope of the present disclosure should be subject to the appended claims.

What is claimed is:

1. A liquid dispensing device comprising:

a liquid dispensing pump comprising:

a first liquid storage cylinder provided with a first liquid inlet/outlet port;

a second liquid storage cylinder provided with a second liquid inlet/outlet port;

a first plunger movably connected to the first liquid storage cylinder, one end of the first plunger being inserted into an inner cavity of the first liquid storage cylinder;

a second plunger movably connected to the second liquid storage cylinder, one end of the second plunger being inserted into an inner cavity of the second liquid storage cylinder; and a driving assembly connected to the first plunger and the second plunger;

a first raw material tank;

a second raw material tank;

a mixing tank;

a first liquid path switcher connected among the first raw material tank, the liquid dispensing pump, and the mixing tank; and a second liquid path switcher connected among the second raw material tank, the liquid dispensing pump, and the mixing tank, wherein, when the driving assembly drives the first plunger and the second plunger to move in a first direction, the first liquid path switcher is configured to selectively enable conduction of the liquid path between the first raw material tank and the liquid dispensing pump and the second liquid path switcher is configured to selectively enable conduction of the liquid path between the second raw material tank and the liquid dispensing pump, so that the liquid dispensing pump sucks raw materials from the first raw material tank into a volume of the first liquid storage cylinder and from the second raw material tank into a volume of the second liquid storage cylinder; and wherein, when the driving assembly drives the first plunger and the second plunger to move in a second direction opposite to the first direction, the first liquid path switcher is configured to selectively enable conduction of the liquid path between the mixing tank and the liquid dispensing pump and the second liquid path switcher is configured to selectively enable conduction of the liquid path between the mixing tank and the liquid dispensing pump, so that the liquid dispensing pump discharges raw materials into the mixing tank at a preset mixing ratio according to the volume of the first liquid storage cylinder and the volume of the second liquid storage cylinder, and a first water quality sensor is provided between the first raw material tank and the first liquid path switcher.

2. The liquid dispensing device according to claim 1, wherein the first plunger has a cross-sectional area larger than that of the second plunger.

3. The liquid dispensing device according to claim 1, wherein a first sealing ring is provided at a junction between the first liquid storage cylinder and the first plunger; and a second sealing ring is provided at a junction between the second liquid storage cylinder and the second plunger.

4. The liquid dispensing device according to claim 1, wherein the driving assembly comprises a motor, a screw rod connected to the motor, a nut sleeved on the screw rod, and a connection block connected to the nut; the connection block being connected to the first plunger and the second plunger, respectively.

5. The liquid dispensing device according to claim 1, wherein the driving assembly comprises a motor, a first crank connected to the motor, and a second crank connected to the motor; the first crank being connected to the first plunger, and the second crank being connected to the second plunger.

6. The liquid dispensing device according to claim 1, wherein the first raw material tank is provided with a first liquid level sensor; the second raw material tank is provided with a second liquid level sensor; the mixing tank is provided with a third liquid level sensor; the first liquid level sensor, the second liquid level sensor, and the third liquid level sensor being electrically connected to the driving assembly, respectively.

7. The liquid dispensing device according to claim 1, wherein the first liquid path switcher and the second liquid path switcher are solenoid valves or plunger valves.

8. The liquid dispensing device according to claim 1, wherein the mixing tank is provided with a drain port, and the drain port is connected to a second water quality sensor.

* * * * *